F. M. ASHLEY.
PROCESS OF GENERATING AND STORING OZONE.
APPLICATION FILED DEC. 15, 1906.
942,046.
Patented Dec. 7, 1909.
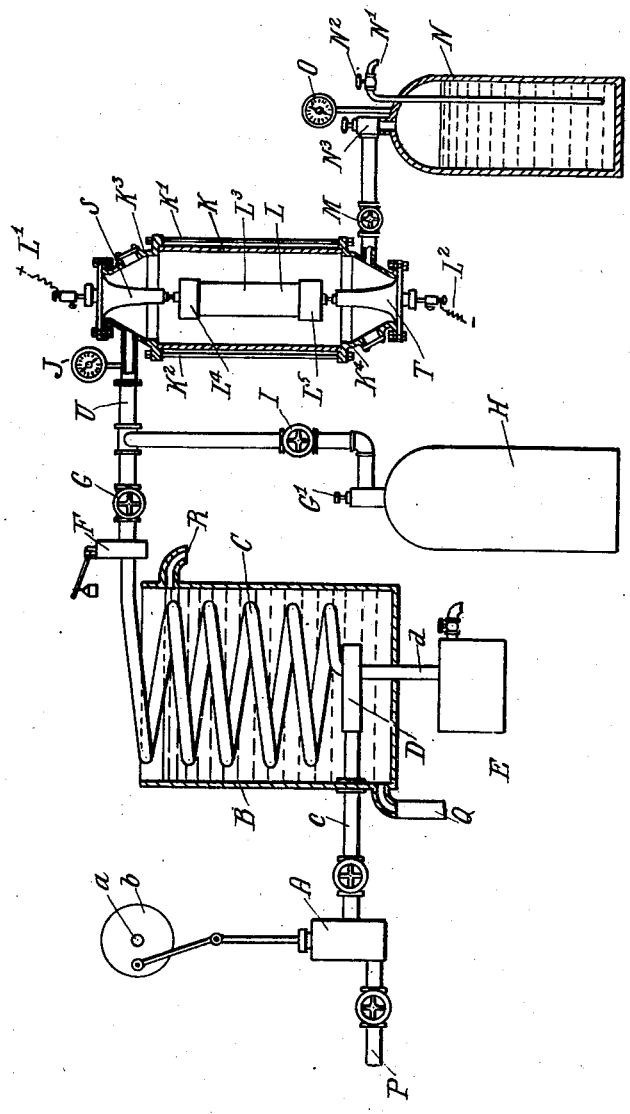
WITNESSES:
INVENTOR

UNITED STATES PATENT OFFICE.

FRANK M. ASHLEY, OF NEW YORK, N. Y.

PROCESS OF GENERATING AND STORING OZONE.

942,046.     Specification of Letters Patent.     Patented Dec. 7, 1909.

Continuation of application filed September 21, 1905, Serial No. 279,567. This application filed December 15, 1906. Serial No. 347,928.

*To all whom it may concern:*

Be it known that I, FRANK M. ASHLEY, a citizen of the United States, residing at West Sixth street, corner of Dewey avenue, New York city, borough of Brooklyn, county of Kings, State of New York, have invented a new and useful Improvement in Processes of Generating and Storing Ozone, of which the following is a specification.

My invention relates to ozone gas and the object of my invention is to provide a method or process of generating, and storing ozone gas and liquid ozone under pressure in such a manner that it may be handled and shipped like oxygen or $CO^2$, or may be liberated in a room immediately after being generated.

The present application is a continuation of my forfeited application No. 279,567, filed September 21, 1905.

Ozone gas is usually generated by an electric discharge passing through an air gap between the terminals of a high tension electric generator, and thereby causing the oxygen in the air to become electrified and changing its active properties. It may also be generated by subjecting pure oxygen to the action of the electric discharge. In most cases the discharge between the terminals is of such high voltage that a spark is formed whereby the oxygen is converted into ozone, but this method of generating ozone is bad for the reason that it burns a portion of the ozone generated, and thereby causes a loss and also renders the remaining ozone impure for the reason that the products of combustion mix with the ozone.

A further reason is that heat destroys ozone and it is therefore necessary to generate and store the ozone by keeping it as cool as possible at all times.

If ozone is generated at atmospheric pressure and afterward compressed, the heat generated by the compression, destroys its active properties, even though the compressors are kept cool, and poor success has attended the attempts to store it in this manner.

I have discovered that ozone may be generated and stored successfully by first compressing the air or oxygen and withdrawing the heat generated thereby and then allowing the pressure to quickly drop a few pounds in the ozonating chamber, thereby expanding the oxygen and thus cooling the gas, and then subjecting the gas to the action of the electric discharge while under pressure, and storing the same in the holding tank without allowing the ozone gas to expand much below the pressure under which it is generated.

Referring to the drawing which forms part of this specification, the figure illustrates a form of apparatus from which I will explain my process of generating and storing ozone gas.

A indicates the cylinder of a pump which may be operated by any suitable means. In the present instance, it is represented as being operated by means of a power shaft $a$ and crank $b$.

B indicates a tank in which is located a coil C which is in open communication with the pipe $c$.

D is a cast iron drum to which the coil C is connected on one side and the pipe $d$ at the lower end, leading therefrom into the trap E.

F indicates a valve which may be set to open against a pre-determined fluid pressure when exerted from the coil side, which is the inlet side to the valve F.

G indicates a stop or check valve.

H indicates a tank containing oxygen under pressure and G′ the valve usually connected therewith; I is a globe valve, J, a pressure gage, K, the casing of the ozonating chamber, L, the ozonator therein, L′ and $L^2$ the electrical conductors leading thereto, M, a valve controlling the outlet from the ozonating chamber, N, the storage tank, N′ the outlet therefrom, $N^2$ the valve controlling said outlet, $N^3$ the valve controlling the inlet and O, is a pressure gage in communication with tank N.

The body portion of the casing K may be a transparent cylinder made of glass and held in place by means of rods K′ and $K^2$ which clamp the ends $K^3$ and $K^4$ tightly thereto as shown. The ozonating device I prefer to make of a tube $L^3$ of glass provided with block tin caps $L^4$ and $L^5$ which act as conductors for the electric current which flows from the positive pole of the generator through the conductor L′ to the cap $L^4$ over the surface of the glass tube $L^3$ to the cap $L^5$ and thence to the generator or coil terminal. The end pieces S and T are of porcelain or other insulating material.

The distance between the caps $L^4$ and $L^5$ should be far enough apart to prevent a spark across but near enough to allow a brush discharge between the caps, consequently this distance will vary depending on the voltage used. With a given voltage, the greater the amperage, the faster the oxygen may be passed through the ozonating chamber and converted into ozone gas. The materials used in the ozonator must be such that the ozone will not destroy them as the ozone is a powerful oxidizing agent. I use cast iron lined with block tin.

The process of generating and storing is as follows: If I have the oxygen already prepared under pressure in the tank as indicated at H, I close the valves G and M and open the valve G' and allow the oxygen to flow into the pipe or space between G' and I and then close valve G' and open valve I, thus providing against a too sudden increase in pressure of gas in the ozonating chamber when the valve I is opened as only the amount of gas trapped can pass to the generator at a time. The gas in the tank H is usually under a pressure of 500 pounds or more and when the pressure in the ozonating chamber reaches, say 450 pounds, the electric current is turned on. The expansion of the oxygen gas in dropping from 500 to 450 pounds causes the ozonating chamber to become very cold and the ozone when generated, retains its active qualities by virtue of this condition. The tank N is filled with water or other suitable fluid and the valve M is opened, thus allowing the ozone to flow into the tank N, but the ozone does not drop in pressure as it would in flowing into an empty tank, as will be readily understood, and therefore, since it does not drop in pressure in any great degree, it does not have to be recompressed, but the pressure in the ozonating chamber is practically the same as that in the tank N. The time in which the oxygen is converted and the tank N filled is controlled by the valve $N^2$ by allowing the ozone gas to force the fluid therethrough as it enters the tank. When the pressure in the tank H falls below that at which it is desired to charge the tank N, the valves G' and I are closed and tank H, is disconnected below the valve I and connected to the pipe P and the pump R is operated to compress the remaining oxygen up to the desired pressure at which the valve F will open, the water in the tank B, which enters at Q and overflows at R, serving to take up the heat of compression, and the gas will then flow to the ozonator and is converted and stored as before explained.

In case the oxygen of the air is used, the pump A compresses the air, the heat being extracted by the water, and any condensed material will be trapped off through the trap E.

The pressure gage on the tank N may be dispensed with if the gage J is used, as the gage J will show the pressure in both tank N and the ozonating chamber when the valve M is open.

The water in the tank N may be charged with ozone gas by allowing the ozone to remain in contact with the water for a short time, or in a shorter time, by agitation of the water while under pressure of the gas.

If the gas is compressed to a high degree and the heat of compression withdrawn, the ozone may be condensed to a liquid state and stored in the tank N.

After the pressure has reached the desired degree in the ozonating chamber, the gas may be regulated to flow directly from the tank H or coil C to the ozonator and the pressure automatically maintained by means of a reducing valve F to be located in the pipe U to prevent an excessive pressure in the ozonating chamber.

The gas may be generated under any desired pressure from one atmosphere upward, the higher the pressure, the more rapid the operation, and the lower the cost of production but the apparatus must be built strong enough to stand the pressure generated.

The operation of the ozonator may be viewed through the glass casing K but it is not necessary that this be made of transparent material when the voltage is known and the sparking distance between the caps $L^4$ and $L^5$ is determined. It is evident that the generating chamber might be made large enough to constitute the storage reservoir also if desired.

It will be seen that I have made a great advance in this art as I believe I am the first to generate and store pure ozone gas under pressure on a commercial scale.

Having thus described my invention what I claim as new and desire to secure by Letters Patent is,

1. The herein described process, consisting in compressing oxygen to a suitable degree, then cooling the same, then passing said oxygen into an ozonator and permitting the pressure to quickly decrease to a predetermined pressure, subjecting the oxygen while in said ozonator to the action of an electric current, and leading the ozone generated, without reducing the pressure to any considerable degree, into a suitable storage receptacle.

2. The herein described process, consisting in compressing a gas containing a considerable quantity of free oxygen, then withdrawing the heat caused by such compression, then subjecting said oxygen to the action of an electric current to generate ozone, and thereafter leading said ozone, into a suitable storage receptacle, without allowing the same to expand to any considerable degree.

3. The herein described process consisting in leading oxygen gas under pressure into an ozonator and subjecting the same to electric treatment and then passing said gas after said treatment into a receptacle in which water or similar fluid is stored, and allowing said water to escape from said receptacle as fast as said gas is admitted therein in such a manner as to prevent the gas from expanding to any considerable degree in said receptacle during the storing thereof.

4. The herein described process, consisting in leading oxygen under pressure into an ozonator and converting the said oxygen into ozone, then leading said ozone into a suitable storage receptacle without allowing the ozone to expand to any considerable degree during the storage thereof.

5. The herein described process consisting in leading oxygen under pressure into an ozonator and then quickly decreasing the pressure therein while the oxygen is treated electrically to convert it into ozone gas, then leading said gas into a suitable storage receptacle and storing same under the same pressure as is maintained in the ozonator.

6. The herein described process consisting in leading a suitable oxygen containing gas under pressure into an ozonator, expanding said gas in said ozonator to lower the temperature thereof, subjecting said gas to the action of electricity to convert said oxygen into ozone and then leading said gas into a storage receptacle and storing same under the same pressure as is maintained in the ozonator.

7. A process of generating and storing ozone consisting in expanding a suitable oxygen containing gas in an ozonating chamber in the presence of an electric current discharge adapted to convert oxygen into ozone; then conducting the gas under the pressure of the ozonating chamber to a storage receptacle; then increasing the gas storage capacity in the receptacle in proportion to the admission of the gas substantially as set forth to maintain an even pressure on said gas after ozonation, substantially as set forth.

8. A process of generating and storing ozone consisting in compressing a suitable oxygen containing gas; then cooling the gas; then treating said gas with an electric current discharge adapted to convert the oxygen into ozone; then conducting the ozonized gas under the pressure at which it was treated to a storage chamber, then increasing the storage capacity in the receptacle while maintaining the pressure on the gas, substantially as set forth.

9. A process of generating ozone consisting in highly compressing the gas to be treated; then cooling the gas while compressed; then delivering the gas to expand in an ozonating chamber, the expansion being sufficient to further cool the gas but not sufficient to reduce the pressure below a predetermined degree above atmospheric pressure; then treating the gas in the ozonating chamber by subjecting it to an electric current discharge adapted to convert oxygen into ozone; then delivering the ozone under substantially the pressure in the ozonating chamber for storage or use, substantially as set forth.

10. A process of generating ozone consisting in continuously compressing a suitable oxygen containing gas to a predetermined pressure and maintaining said pressure constant; then refrigerating the said gas while compressed; then continuously delivering the gas to an ozonator under constant and predetermined pressure; then converting the oxygen to ozone by subjecting the said gas while under pressure to an electric current discharge adapted to convert oxygen into ozone in an inclosed chamber; and then continuously discharging at a constant pressure the ozonized gas from the inclosed chamber, substantially as set forth.

11. A process of generating ozone consisting in compressing a suitable oxygen containing gas; then refrigerating the gas while compressed; then subjecting the gas to an electric current discharge adapted to convert oxygen into ozone without heat; then delivering the gas under the same pressure 95 at which it was converted, substantially as set forth.

In testimony whereof, I, FRANK M. ASHLEY have signed my name to this specification in the presence of two subscribing witnesses, this 3d day of December 1906.

FRANK M. ASHLEY.

Witnesses:
N. C. MILLER,
AMELIA BLAUVELT.